United States Patent [19]
Lodrick

[11] 4,456,258
[45] Jun. 26, 1984

[54] GAME WITH AN ICOSAHEDRAL GEODESIC SPHERE BOARD

[76] Inventor: Lawrence E. Lodrick, 2436 Harrison Ave. N., Rochester, Mich. 48063

[21] Appl. No.: 345,004

[22] Filed: Feb. 2, 1982

Related U.S. Application Data

[63] Continuation of Ser. No. 148,293, May 9, 1980, abandoned.

[51] Int. Cl.³ .............................. A63F 3/00; A63F 3/02
[52] U.S. Cl. .................................. 273/241; 273/280; 273/287; 273/282; 273/261; 52/DIG. 10; 428/11; 428/542.2
[58] Field of Search ............... 273/241, 236, 287, 261; D21/23, 24; 52/DIG. 10; 428/11, 542.2, 542.4; 434/131–148

[56] References Cited

U.S. PATENT DOCUMENTS

| | | | |
|---|---|---|---|
| 2,273,009 | 2/1942 | Fischer | 273/261 X |
| 2,408,651 | 10/1946 | Kiehl | 434/141 |
| 2,896,338 | 7/1959 | Petersen | 434/134 |
| 2,971,276 | 2/1961 | Scarborough et al. | 434/131 |
| 3,359,003 | 12/1967 | Kass | 273/241 |
| 4,005,868 | 2/1977 | Hein | 273/156 R |
| 4,214,808 | 7/1980 | Hampson | 272/8 M |
| 4,339,136 | 7/1982 | Gittings | 273/242 |

OTHER PUBLICATIONS

Magnus J. Wenninger, *Polyhedron Models*, pub. 1971, pp. 4–8 and 17.

*Primary Examiner*—Richard C. Pinkham
*Assistant Examiner*—Scott L. Brown
*Attorney, Agent, or Firm*—Basile, Weintraub & Hanlon

[57] ABSTRACT

The invention refers substantially to games and their construction. The games are played on the outer surface of a geometric solid necessitating piece and gaming surface construction adequate to permit piece and surface adherance. Also the geometric solid utilized is scribed or covered with an appropriate map or grid pattern to provide separate playing positions and thus specific moves of play are possible. The geometric solid chosen is a three phase icosahedron geodesic sphere. The icosahedron geodesic sphere is supported by support pins projecting from the sphere resting in a concave support surface.

3 Claims, 11 Drawing Figures

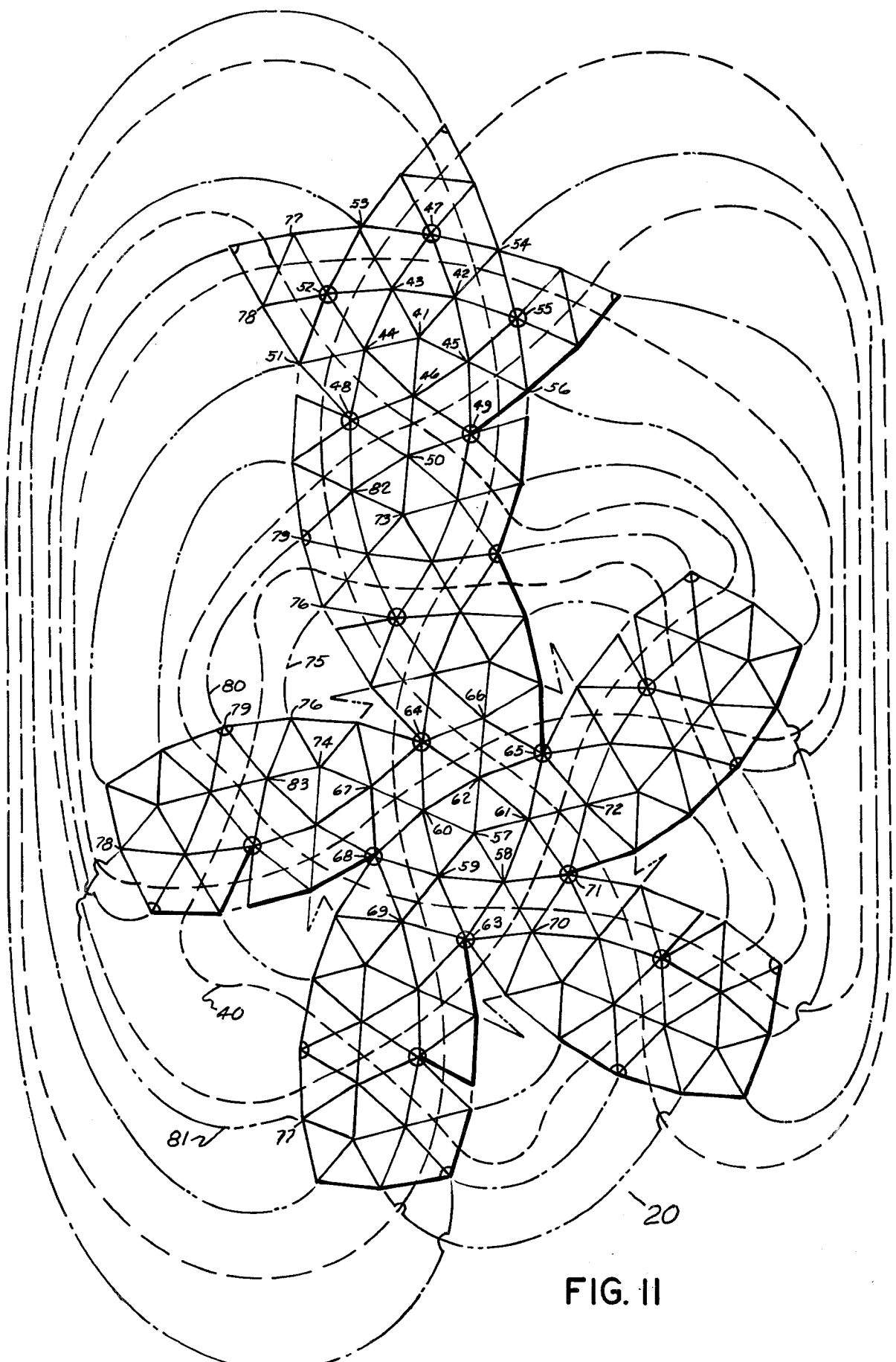
FIG. II

GAME WITH AN ICOSAHEDRAL GEODESIC SPHERE BOARD

This application is a continuation of application Ser. No. 148,293, filed May 9, 1980 now abandoned.

FIELD OF INVENTION

The novelty of the invention relates to a refined game for basically two or more opponent players with opposing pieces said playing surface being so constructed as to represent the outer surface of a geometric solid, such as a cube, cone, cylinder, sphere, or any combination thereof, and because virtually any surface can be developed onto a plain surface the game may be visualized as a board game in the third dimension.

BACKGROUND

The game concept brings to the fore a game desirable by both children and adults of such a logic play difficulty to challenge the most advanced adult involvement yet also employs simple enough moves to allow for a child's enjoyment while playing the game. It is our contention that the game should rival chess in its appeal at large due to the games inherant logic of play and simplicity of moves along with the novelty of presentation. Further development along these indicated lines suggests that war gaming personnel, a growing fraternity of people interested in various battles of past history or fictional development could avail themselves of the enclosed concepts.

DESCRIPTION OF THE PRIOR ART AND PRIOR ART STATEMENT

Various games and especially those of the board variety are well known in this art however it has not been found that any previous presentations were taken in this form.

SUMMARY OF THE INVENTION

The invention relates to games in general and more specifically to specially designed gaming surfaces.

A broad object of the invention is to provide a game which has certain novel features of construction and utilization that greatly increase its visual appeal and play value.

A more specific object of the invention is to provide a game wherein the playing surface is the outside surface of a geometric solid.

A further object of the invention is to provide a game wherein the playing surface is a geometric solid's outer surface upon which is scribed or printed a map or grid pattern or the like, said geometric solid being a cube, cone, cylinder, or sphere of any configuration.

A still further object of the invention is to provide that the geometric playing surface is the outer surface of a three phase icosahedron geodesic sphere.

A yet further object of the invention is to provide that the game can be played from any direction while floating in space, yet a means being provided to allow play in a gravity influenced environment.

A still further object of the invention is to provide that the game can be played by two or more players to possibly twenty or more depending on the geometric solid used or phase of icosahedron geodesic used and the selection of home points and/or the positions in which pieces are placed before starting game play.

A still further object of the invention is to provide several new designs of playing pieces to facilitate their use on the outer surface of the geometric solid gaming surface.

A still further object of the invention is to provide a game of the character described possessing various novel features of construction appearance and use which result in a game possessing greatly increased entertainment, educational and actual play value.

Other objects advantages and features will become readily apparent as the description proceeds.

The invention may be best understood from the following detailed description thereof, taken in connection with the annexed drawings wherein:

BRIEF DESCRIPTION OF THE DRAWING

The description herein makes reference to the accompanying drawing wherein like numbers refer to like parts throughout the several views and wherein:

FIG. 11 illustrates a three phase icosahedron geodesic sphere developed onto a plain surface showing various lines indicating various paths of progression or unit positions.

DETAILED DESCRIPTION OF THE PREFERRED EMBODIMENT

Figure 1:
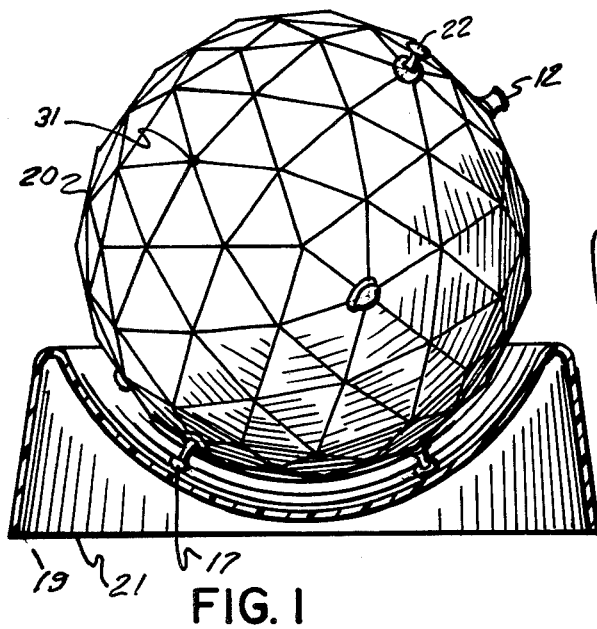
FIG. 1 is a pictorial view and partial section of the first embodiment of the game

Referring now to these drawings, the present game 19 can be seen to comprise a plastic or the like geodesic sphere 20 upon which are positioned two sets of playing pieces 12 thru 17. Sphere 20, with pieces 12 thru 17 thereon, is placed in a plastic or the like dish 21, said pieces 12 thru 17 supporting sphere 20 above dish 21 by contacting dish 21 with their outer most extremity thus allowing the sphere to be rotated and revolved in any given direction facilitating study of the entire sphere surface. If play should get confined to one area of the sphere 20 neutral supports 22 can be utilized to facilitate continued rotation. It should be noted that these supports 22 only facilitate support in the present embodiment and in no way affect play, however the supports certainly could influence play upon revision of the rules of play.

Figure 2:
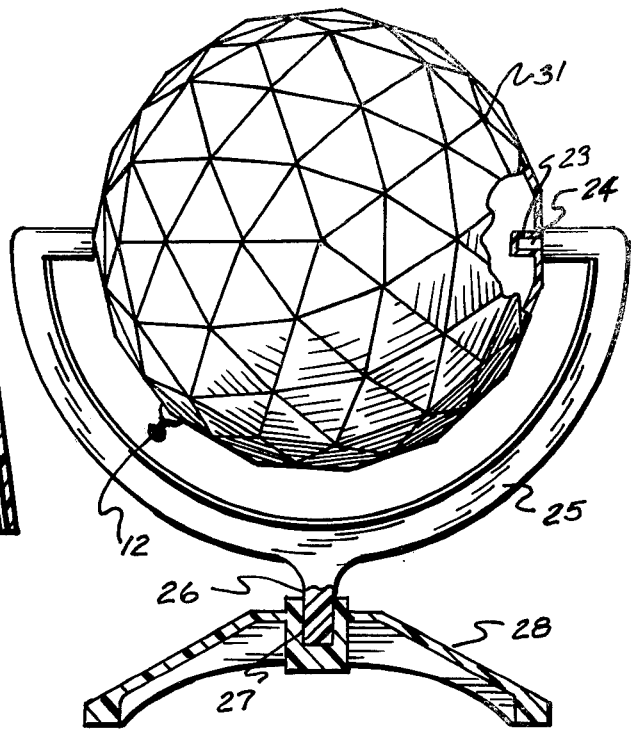
FIG. 2 is a pictorial view and partial section of the second embodiment of the game

Another method of support of the sphere 20 is achieved in FIG. 2, into holes 23, which are not in conflict with playing piece positions and directly opposite each other, are placed pins 24 which are an extension of support 25. The holes 23 being slightly larger than pins 24 allows rotation of sphere 20 around the axis through pins 24 note being taken that adequate clearance is provided between support 25 and sphere 20 to allow pieces 12 thru 17 to clear support 25 upon revolving around pins 24. Support 25 has affixed thereto in its center and outboard of sphere 20, boss or pin 26 which is placed in hole 27 of base 28.

Figure 3:
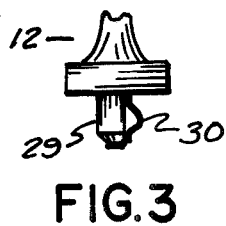
FIG. 3 illustrates a first means of holding the pieces on the playing surface
Figure 4:
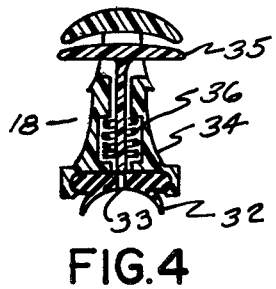
FIG. 4 illustrates a second means of holding the pieces on the playing surface

The hole 27 being slightly larger than boss 26 allows rotation along the axis perpendicular to the axis through pins 24 of support 25, thus facilitating improved visualization of the total playing surface of sphere 20. Also support 25 could have attached to boss 26 a cable which in turn could be attached to a support higher than the sphere suspending said sphere in a playing position. The sphere 20 could be made of clear plastic or the like to further facilitate adequate visualization. Since the play and subsequent movement of pieces takes place on the total geometric surface, a means of holding the playing pieces to the playing surface is required and two are shown in FIGS. 3 and 4. FIG. 3 shows piece 12 with boss 29 protruding from its underside with pressure finger 30 being positioned therein. Boss 29 is slightly smaller while pressure finger 30 extends beyond the boundary of the holes 31 into which they are pushed. These holes 31 are located wherever a piece will be located on game sphere 20. Thus when boss 29 with finger 30 thereon is pushed into these holes, finger 30 and boss 29 exert pressure against the walls of the hole, holding the playing piece in place. A further method is shown in FIG. 4, wherein a suction cup 32 with a hole 33 therein is attached to part 34 of playing piece 18. Through the center of part 34 pluging hole 33 is plunger 35 held against hole 33 by spring 36. When plunger 35 is grasped and with part 34 pushed in hypodermic fashion hole 33 opens eliminating suction facilitating removal of the playing piece from the playing surface. To reposition piece 18 it is simply pushed against sphere 20 without touching plunger 35 thus a vacuum is again created. Obviously the magnet is another method of holding two things together in a repeated breakaway fashion and can be used in this instance also. Further Velcro fastening could be utilized in this manner.

The playing surface of the present embodiment of the invention is shown in FIG. 11 and can be seen to be composed of triangular areas each of which is one segment of a three phase icosahedron geodesic sphere. Even though game play can be commenced from triangular area to triangular area the present embodiment utilizes the intersection points as piece positions. The dotted lines such as line 40, which is actually the true equator of sphere 20, are great circle lines defined as equatorial lines or circumferance lines around the sphere at its largest diameter with the path along points 56, 49, 50, 82, 79 etc. . . being defined as a great circle path because of its parallelity to the dotted or circumference line. Another great circle path would be 55, 45, 46, 48, etc. . . The center line 80 indicates a unit point which shows that a playing piece on the great circle point 79 at one end of center line 80 is actually on the great circle point 79 at the other end of center line 80. The great circle point 79 being defined as the center point of the twenty true hexigons present in the three phase icosahedron geodesic sphere at which the great circle paths intersect or cross each other. Another such point is point 48 and for clarification all are circled in FIG. 11. Phantom line 75 defines a similar condition for a penta point 76. All penta points are defined as the points immediately adjacent to a penta center point which in turn is defined as one of the twelve polar points around which are generated the twelve true pentagons present in the three phase icosahedron geodesic sphere. Further a penta line is defined as the line between two pentacenter points such a line being 41, 46, 50 and 73.

The pieces of one team are differentiated from the pieces of another team by a color difference.

Figure 10:
FIG. 10 illustrates piece #17

Decision of who moves first is made by the winner of the flip of a coin deciding if he or his opponent will move first and the one who moves first orients his set up pattern first. The initial game set up is as follows:

Piece 17, FIG. 10, is positioned at its home penta center point 41 and the opposition piece 17 is positioned on its home penta center point 57 which in the third dimension is directly opposite point 41.

Figure 9:
FIG. 9 illustrates piece #16

Piece 16, FIG. 9, is positioned at penta point 46 and the opposition piece 16 is placed on penta point 62.

Figure 8:
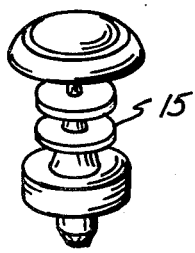
FIG. 8 illustrates piece #15

The two pieces 15, FIG. 8, are placed at penta points 44, 45 and opposing pieces 15 at penta points 60 and 61.

Figure 7:
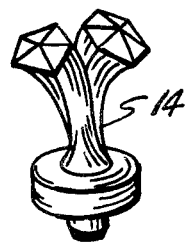
FIG. 7 illustrates piece #14

The three pieces 14, FIG. 7, are placed on great circle points 47, 48 and 49 with the opposition pieces 14 being on great circle points 63, 64 and 65.

Figure 6:
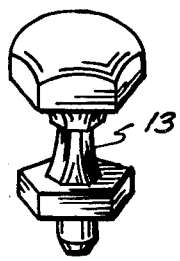
FIG. 6 illustrates piece #13

The two pieces 13, FIG. 6, are placed on penta points 42, 43 and opposition pieces 13 on penta points 58 and 59.

Figure 5:
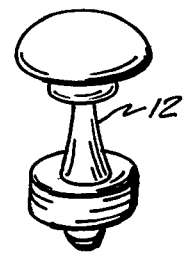
FIG. 5 illustrates piece #12

Lastly the seven pieces 12, FIG. 5, are initially positioned on penta points 50, 51, 53, 54, 56 and great circle points 52 and 55 with opposition pieces 12 on penta points 66, 67, 69, 70, 72 and great circle points 68 and 71.

The playing pieces being thus set up, play can be commenced. One further consideration however, will be initial set orientation around home penta center point at 41 and 57. As long as the given team pieces and their position to each other in the outer ring defined by points 47 thru 56 is maintained their rotation around home center point is arbitrary bearing in mind pieces 14 must start on great circle points. Also as long as the given team pieces and their position to each other in the inner ring defined by points 42 thru 46 are maintained their rotation around home center point is arbitrary. Thus several different game progressions will result depending on the initial orientation of pieces.

To further explain the present embodiment of the invention each piece will be discussed in its play motion. Piece 12 of which seven per team are required is the weakest piece on the playing surface in that it can only move one position at a time along a great circle path as from point 50 to 82 and not 50 to 73 and can only capture across a great circle line as from 82 to 79 or 79 to 76 and piece 12 is not able to jump another piece. Piece 12 must always move away from home base; thus piece 12 cannot go backwards yet can move as many times, one move at a time, around the equator or great circle path on either side of great circle line 40, the true equator of sphere 20. Piece 12 can also cross great circle lines when moving parallel to another great circle line, as from point 48 to 82 but not 56 to 45. Further the piece 12 upon reaching an opponents home pentagon point not necessarily the center penta point, can be replaced with any previously captured piece.

The piece 13 of which two per team are required is the next strongest piece on the playing surface in that it can only move from a center pentagon point to a center pentagon point as from 41 to 73 or 73 to 74 when no intervening pieces are present. If however, the intervening piece is an opponents piece and at 46, the piece 13 can capture by replacing this piece. Not necessarily upon this players next move but upon this piece 13's next move, it proceeds to a pentagon center point 41 or 73 or it can capture an additional opponents piece at 50. No move with angle deviation from the penta line connecting the penta center points as from 46 to 44 or 45 is allowable under these rules of play. The piece 13 can move backwards or forwards.

Piece 14 of which three per team are required is the next or third strongest piece on the playing surface in that it can only move from a great circle point to an adjacent penta center point and from a penta center point to the nearest or adjacent great circle point which is unoccupied, unless said point is occupied by an opponent's piece thereupon capture takes place. The piece 14 can jump intervening pieces and move in any direction.

Piece 15 of which two per team are required is the next or fourth strongest piece on the playing surface in that it can move any number of spaces or points along a great circle line without intervening pieces and without angle deviation capturing an opponents intervening piece by replacing its position. Also the piece 15 can capture to a penta point of that opponent occupied penta point is adjacent to its present position and must upon the piece 15's next move after capture move back to this adjacent original position at which it was before capture. Piece 15 can move backwards if desired.

Piece 16 of which one per team is required is the strongest piece on the playing surface in that it can move like piece 13 and like piece 15 again without angle deviation and no combination of the two; the only difference being that it does not have to move to penta center points as piece 13 must, but can move from point 46 to 50 if desired even though no capture is achieved. This piece also captures by replacing the position of the opponents piece.

The last piece to be described of which one per team is required is piece 17 which represents the home base. Said piece 17 can move to any unoccupied point one move at a time in any direction and also captures by occupying the opponents position.

The game will have come to its conclusion when one player has captured his opponents piece 17. If this becomes impossible a draw is declared. One player may conceed at any time thus declaring his opponent the winner. A shortened version of the game can be achieved with the forcing of piece 17 off its home base being sufficient for the win.

Further the total geometric solid can be considered as the field of play and the piece would then be considered to occupy and/or have its field of influence on the point diametricly opposite said pieces present position and conversely be subject to the influence of an opponent occupying this opposite point, thus increasing the difficulty of play by enlarging the number of variables to be considered. Also, a higher phase icosahedron can be used increasing play variables and allowing more players or teams of playing pieces to occupy the sphere.

It can thus be seen that there has been disclosed a new and improved game which tends to expand game play into a three dimensional challenge of interest for two or more players.

It should be understood by those skilled in the art of games that other forms of the present invention may be had, all coming within the spirit of the invention and scope of the appended claims.

What is claimed is as follows:

1. A gaming device wherein the playing surface is the outer surface of an icosahedron geodesic sphere comprising:
   a multiplicity of evenly distributed support pins projecting vertically from said surface a predetermined distance, the point of attachment for said support pins being at the center of the triangular surfaces forming said geodesic surface;
   said support pins having at their outer end a hemispherical shape;
   an imaginary, continuous surface joining the outermost points of said support pins defining an imaginary sphere;
   a lower support member having a spherical concave support surface equal in radius to said imaginary sphere; and
   said geodesic sphere and support pins resting rotatably in said concave support surface.

2. The gaming device as defined in claim 1 further comprising a plurality of playing pieces wherein said triangular surfaces of said icosahedron geodesic sphere comprise a grid for the placement of said playing pieces in a manner and sequence defined by the rules of play;
   said playing pieces being shorter than said support pins; and
   said triangular surfaces having at their apex a circular aperture, said playing pieces having at their lower end a cylindrical projection which is snugly retained by said circular aperture.

3. A gaming device comprising:
   a geodesic spheroid playing surface;
   the playing surface being formed of a plurality of polygons, each contiguous to at least one other of said other polygons;
   the polygons being comprised only of those polygons present on the surface of a geodesic solid;
   a plurality of playing pieces, the playing pieces being movable across the playing surface in a predetermined manner and sequence defined by the rules of play; means for rotatably supporting the geodesic spheroid;
   the supporting means comprising:
   a multiplicity of evenly distributed support pins projecting vertically from the playing surface a predetermined distance, the point of attachment of the support pins being at the center of the polygons;
   the support pins having at their outer ends a hemispherical shape;
   an imaginary continuous surface joining the outermost points of the support pins defining an imaginary sphere; and wherein
   a lower support member having a spherical concave support surface equal in radius to the imaginary sphere; and
   the geodesic solid and support pins rest in the concave support surface.

* * * * *